(12) United States Patent
Qiu et al.

(10) Patent No.: US 11,098,860 B2
(45) Date of Patent: Aug. 24, 2021

(54) CUTTABLE LED STRIP

(71) Applicant: Lumileds LLC, San Jose, CA (US)

(72) Inventors: Yifeng Qiu, San Jose, CA (US); Frederic Stephane Diana, Santa Clara, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/694,726

(22) Filed: Nov. 25, 2019

(65) Prior Publication Data

US 2020/0116316 A1    Apr. 16, 2020

Related U.S. Application Data

(63) Continuation of application No. 15/662,931, filed on Jul. 28, 2017, now Pat. No. 10,487,995.

(51) Int. Cl.

| *F21S 4/24* | (2016.01) |
| *H05B 45/00* | (2020.01) |
| *H05B 45/46* | (2020.01) |
| *H05B 45/395* | (2020.01) |
| *F21V 21/08* | (2006.01) |
| *F21Y 115/10* | (2016.01) |

(52) U.S. Cl.
CPC .............. *F21S 4/24* (2016.01); *H05B 45/395* (2020.01); *H05B 45/46* (2020.01); *F21V 21/0808* (2013.01); *F21Y 2115/10* (2016.08)

(58) Field of Classification Search
CPC ........... F21S 4/24; H05B 45/00; H05B 45/46; H05B 45/395; F21V 21/0808; F21Y 2115/10; Y02B 20/30
See application file for complete search history.

(56) References Cited

U.S. PATENT DOCUMENTS

| 8,487,537 | B2 | 7/2013 | Sloan et al. |
| 9,538,596 | B2 | 1/2017 | Radermacher |
| 10,487,995 | B2 * | 11/2019 | Qiu ........................ H05B 45/00 |
| 2010/0181919 | A1 | 7/2010 | Sloan et al. |

(Continued)

FOREIGN PATENT DOCUMENTS

| CN | 111149435 A | 5/2020 |
| TW | 201910678 A | 3/2019 |

(Continued)

OTHER PUBLICATIONS

"U.S. Appl. No. 15/662,931, 312 Amendment filed Jan. 15, 2019", 10 pgs.

(Continued)

*Primary Examiner* — Matthew Mikels
(74) *Attorney, Agent, or Firm* — Schwegman Lundberg & Woessner, P.A.

(57) ABSTRACT

A light-emitting diode (LED) strip is disclosed. The LED strip includes: an input terminal for receiving a first reference signal, a first LED coupled to an end of a power bus and driven by a first current signal, the first current signal being supplied to the first LED via the power bus; a current-copying circuit arranged to control a flow rate of the first current signal based on the first reference signal; and a first switching element arranged to re-couple the first LED to the power bus when the first LED is disconnected from the end of the power bus as a result of the LED strip being cut at a first location.

20 Claims, 6 Drawing Sheets

(56) References Cited

U.S. PATENT DOCUMENTS

| | | | |
|---|---|---|---|
| 2013/0313983 A1* | 11/2013 | Radermacher | H05B 45/48 315/187 |
| 2015/0092413 A1 | 4/2015 | Li et al. | |
| 2019/0032870 A1 | 1/2019 | Qiu et al. | |

FOREIGN PATENT DOCUMENTS

| | | |
|---|---|---|
| WO | WO-2012/104800 A2 | 8/2012 |
| WO | WO-2019/023415 A1 | 1/2019 |

OTHER PUBLICATIONS

"U.S. Appl. No. 15/662,931, Non-Final Office Action dated May 25, 2018", 7 pgs.

"U.S. Appl. No. 15/662,931, Notice of Allowance dated Jul. 25, 2019", 8 pgs.

"U.S. Appl. No. 15/662,931, Notice of Allowance dated Oct. 15, 2018", 8 pgs.

"U.S. Appl. No. 15/662,931, Response filed Apr. 27, 2018 to Restriction Requirement dated Mar. 7, 2018", 10 pgs.

"U.S. Appl. No. 15/662,931, Response filed Aug. 22, 2018 to Non-Final Office Action dated May 25, 2018", 11 pgs.

"U.S. Appl. No. 15/662,931, Restriction Requirement dated Mar. 7, 2018", 7 pgs.

"European Application Serial No. 18747090.1, Office Action dated Mar. 18, 2020", 3 pgs.

"International Application Serial No. PCT/US2018/043812, International Preliminary Report on Patentability dated Feb. 6, 2020", 7 pgs.

"International Application Serial No. PCT/US2018/043812, International Search Report dated Oct. 23, 2018", 4 pgs.

"International Application Serial No. PCT/US2018/043812, Written Opinion dated Oct. 23, 2018", 5 pgs.

\* cited by examiner

CUTTABLE LED STRIP

CLAIM OF PRIORITY

This application is a continuation of U.S. application Ser. No. 15/662,931, filed Jul. 28, 2017, now issued as U.S. patent Ser. No. 10/487,995, which is hereby incorporated by reference in its entirety.

FIELD OF INVENTION

The present disclosure relates to light emitting diode (LED) light sources, in general, and more particularly to a cuttable LED strip.

BACKGROUND

Light-emitting diode (LED) strips can be used in various lighting applications, including general indoor lighting, decorative lighting, automotive lighting, and landscape lighting. LED strips can often be cut to a size that fits a particular application, and this characteristic makes them attractive to lighting designers and light fixture manufacturers. However, some LED strips cannot always be cut with sufficient precision to the size that is needed. For example, flexible LED strips that feature a segmented design may be cut in lengths that are multiples of their segment lengths (e.g., 30 cm). While such strips may be desirable from a cost perspective, their inability to be cut with greater precision may limit their utility.

Accordingly, the need exists for a new LED strip that can be cut with greater precision to a desired length. Furthermore, the need exists for a LED strip system that can be sized with greater precision, while retaining some of the cost advantages of flexible LED strips that feature a segmented design.

SUMMARY

The present disclosure addresses this need. According to aspects of the disclosure, a light-emitting diode (LED) strip is disclosed. The LED strip includes: an input terminal for receiving a first reference signal, a first LED coupled to an end of a power bus and driven by a first current signal, the first current signal being supplied to the first LED via the power bus; a current-copying circuit arranged to control a flow rate of the first current signal based on the first reference signal; and a first switching element arranged to re-couple the first LED to the power bus when the first LED is disconnected from the end of the power bus as a result of the LED strip being cut at a first location.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

DETAILED DESCRIPTION

In one aspect, a cuttable LED strip is disclosed that can be cut to size more precisely than other LED strip designs. For example, the cuttable LED strip may be cut with a precision that is many times greater than the precision with which segmented LED strips can be cut.

In another aspect, the cuttable LED strip may be a LED strip that is provided alone for use in various applications, such as general indoor lighting, decorative lighting, automotive lighting, and landscape lighting.

In another aspect, the cuttable LED strip may be provided in a kit that includes a primary LED strip that is less costly to make but cannot be cut with the same precision as the cuttable LED strip. When the cuttable LED strip is provided in such kit, the cuttable LED strip can be used to augment the primary LED strip as needed. For instance, if the primary LED strip can be cut to lengths that are multiples of 30 cm and a length of 35 cm is needed, a 30-cm segment of the primary LED strip can be augmented with a 5-cm segment of the cuttable LED strip to achieve the desired length.

In another aspect, the cuttable LED strip may include a current-copying circuit for matching the current driving the cuttable LED strip to the current that is used to drive the primary LED strip. The current matching may be necessary to ensure uniform brightness across the primary LED strip and the cuttable LED strip.

In another aspect, the current-copying circuit may be compatible with both constant-current and constant-voltage power supplies. This may permit the cuttable LED strip to be easily deployed in various situations.

In another aspect, a light-emitting diode (LED) strip is disclosed, comprising: an input terminal for receiving a first reference signal; a first LED coupled to an end of a power bus and driven by a first current signal, the first current signal being supplied to the first LED via the power bus; a current-copying circuit arranged to control a flow rate of the first current signal based on the first reference signal; and a first switching element arranged to re-couple the first LED to the power bus when the first LED is disconnected from the end of the power bus as a result of the LED strip being cut at a first location.

In another aspect, a light-emitting diode (LED) strip is provided comprising: a power bus; and a plurality of removable sections, wherein any removable section includes: (a) a respective LED that is connected to an end of the power bus in series with one or more other LEDs that are located in at least one other removable section, and (b) a respective switching element arranged to recouple the respective LED to the power bus when the first LED is disconnected from the end of the power bus as a result of the LED strip being cut in an adjacent location.

In another aspect, a system is provided, comprising: a first light-emitting diode (LED) strip including a first LED and a second LED strip. The second LED strip is arranged to receive a first reference signal from the first LED strip that is representative of a flow rate of a first current signal that drives the first LED. The second LED strip includes: a power bus; a plurality of second LEDs connected in series to an end of the power bus and driven by a second current signal; and a current-copying circuit arranged to match a flow rate of the second current signal to that of the first current signal based on the first reference signal.

Figure 1:
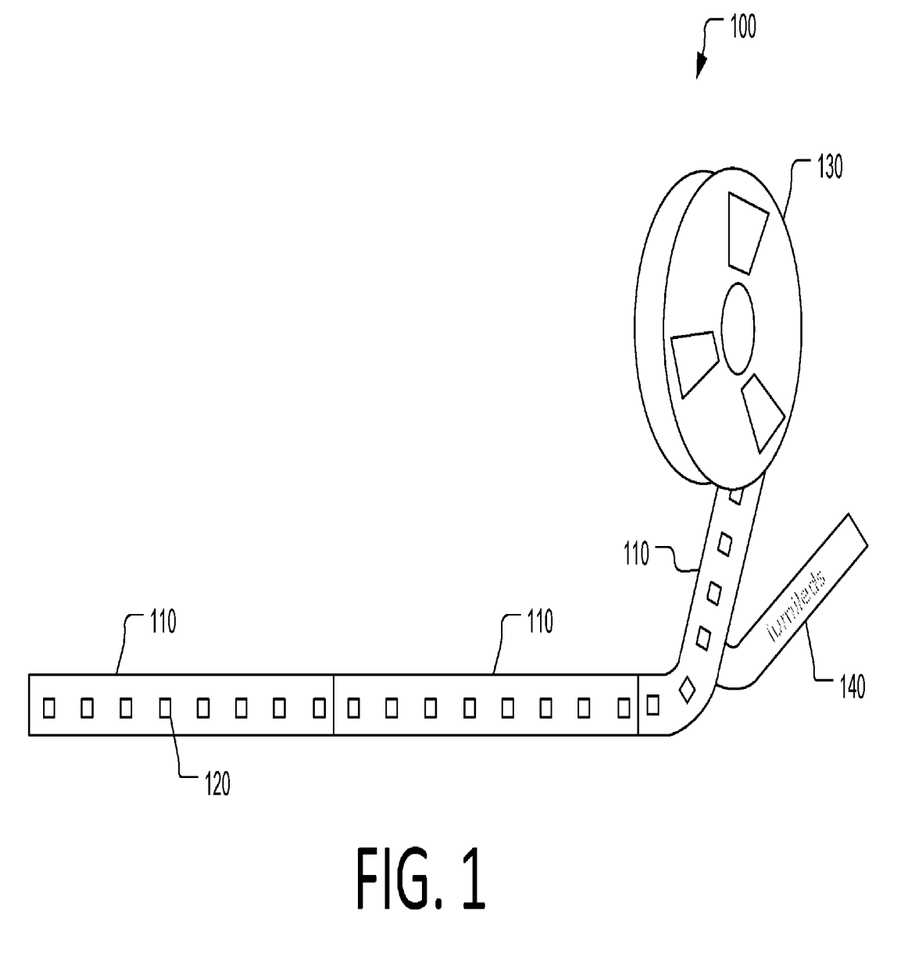
FIG. 1 is a diagram of an example of a LED strip that features a segmented design, according to aspects of the disclosure.

FIG. 1 is a diagram of an example of a LED strip 100, according to aspects of the disclosure. The LED strip 100 is a flexible LED strip suitable for use in linear light fixtures. The LED strip includes segments 110 that can be connected in parallel to either a constant current or constant voltage LED power supply. Each of the segments 110 may have a fixed length (e.g., 30 cm) and include a series of LEDs 120. The LED strip 100 may be rolled on a reel 130 and it may include an adhesive backing that is exposed when a release liner 140 is peeled away.

In the present example, the LED strip 100 is manufactured into a series of repetitive segments 110 that have fixed lengths. Despite its flexibility, the length of the LED strip can only increase or decrease per unit segment. In order to achieve a practical trade-off between the total driving current and the voltage, the LEDs in each segment are connected in series. Consequently, when the LED strip is cut to length, it has to be cut by the complete segment. In other words, the flex strip 100, unless custom designed for a fixture, would not necessarily match the length of every fixture that it will be attached to, either leaving a piece of one of its segments, that cannot fit, hanging outside of the light fixture or creating a dark zone in the light fixture. While designing a flex strip for every new fixture solves this issue, it creates the problem of an overblown inventory of different LED strip models.

Figure 2A:
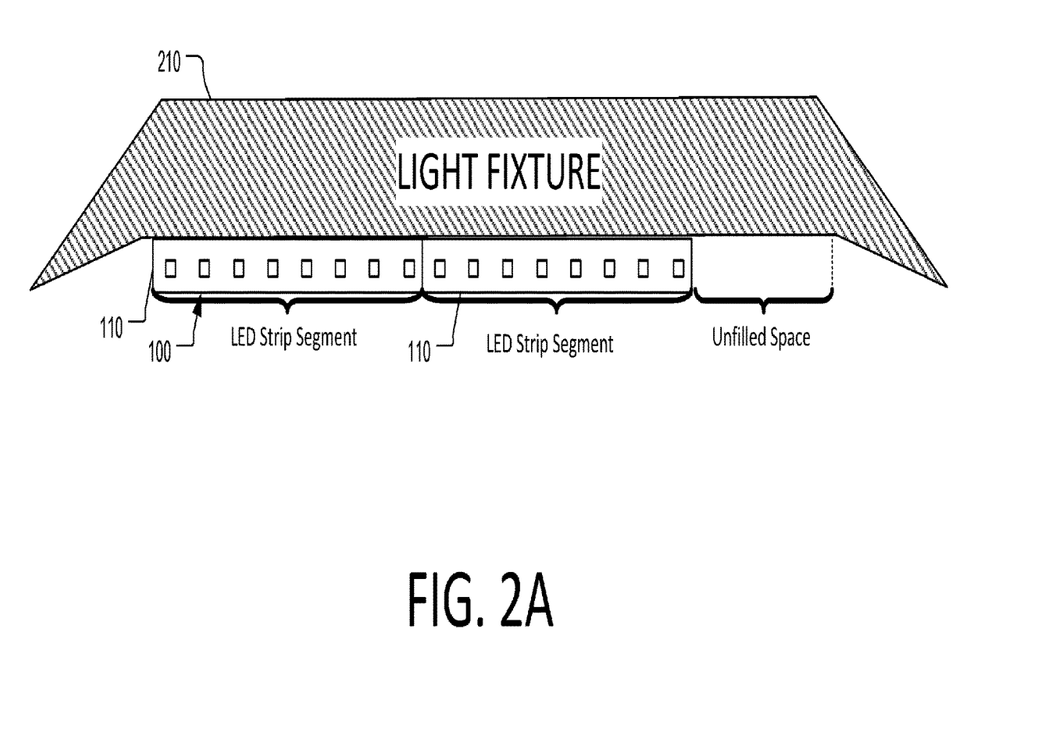
FIG. 2A is a diagram illustrating the use of the LED strip of FIG. 1 inside a light fixture, according to aspects of the disclosure.

FIG. 2A depicts an example of a light fixture 210 having a portion of the LED strip 100 installed therein. As illustrated, the length of the light fixture 210 is greater than the combined length of the two segments 110 that are placed inside it, but less than three times the segments' length. Thus, when two of the segments 110 are installed in the light fixture 210, some of the space available in the light fixture remains unfilled, which may lead to the appearance of a dark spot when the light fixture 210 is turned on.

Figure 2B:
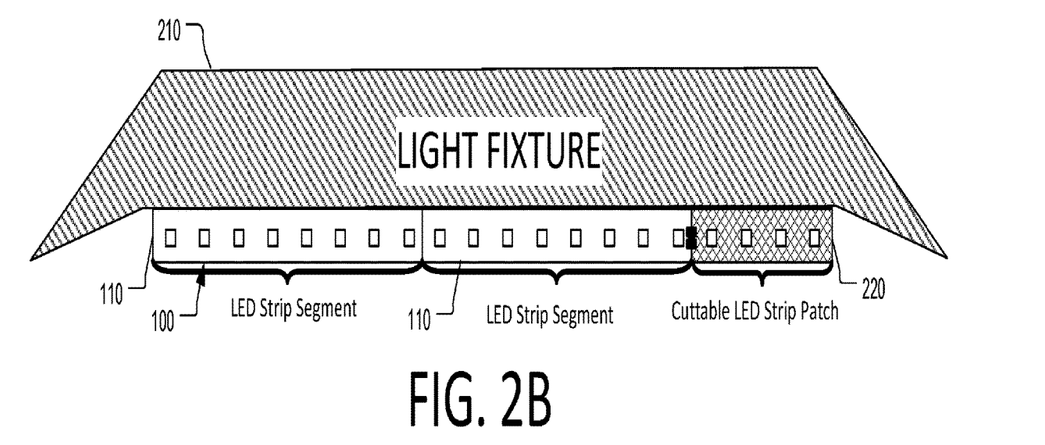
FIG. 2B is a diagram illustrating the use of the LED strip of FIG. 1 in conjunction with a cuttable LED strip, according to aspects of the disclosure.

FIG. 2B is a diagram illustrating the use of a cuttable LED strip 220 to occupy the unfilled space in the light fixture 210. In the present example, the cuttable LED strip 220 is cut to the length of the infilled space and connected to the segments 110 to form a continuous light source that spans the entire length of the light fixture 210.

Figure 3A:
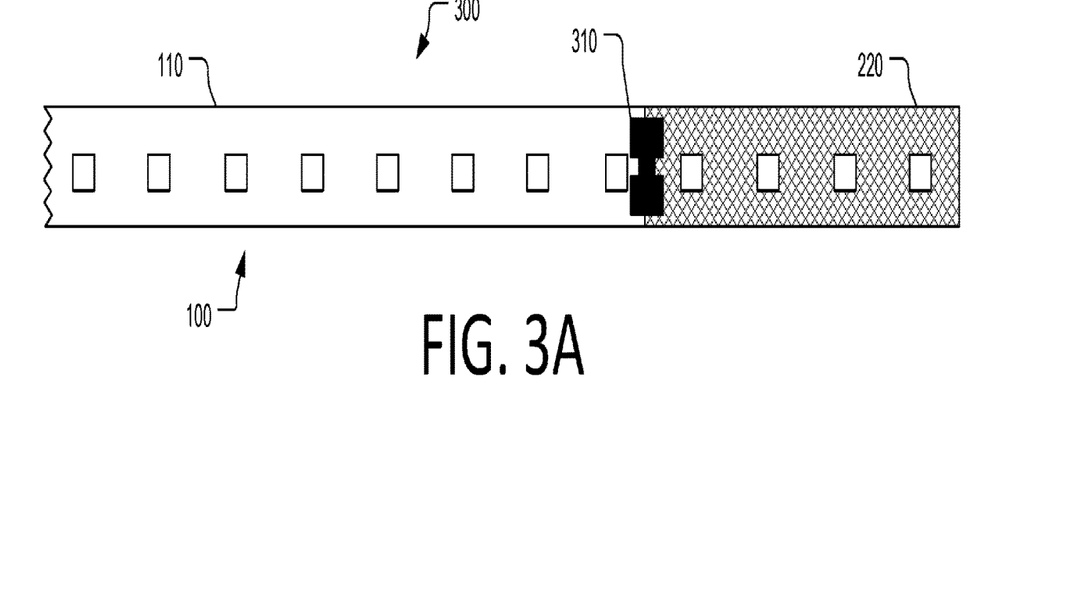
FIG. 3A is a diagram illustrating the manner in which the LED strip of FIG. 1 is connected to the cuttable LED strip of FIG. 2B, according to aspects of the disclosure.

FIG. 3A depicts an example of a system 300 including at least one segment 110 of the LED strip 100 along with the cuttable LED strip 220. As illustrated, after the cuttable LED strip 100 is cut to the desired size, it can be connected to the LED strip 100 via a connector 310. Connector 310 may be any suitable type of connector that is arranged to couple the terminals on the end of the segment 110 to those of the cuttable LED strip 220. For example, connector 310 may include a slide-in wire connector, a strip-to-strip connector, a gapless connector, and/or any other suitable type of connector.

Figure 3B:
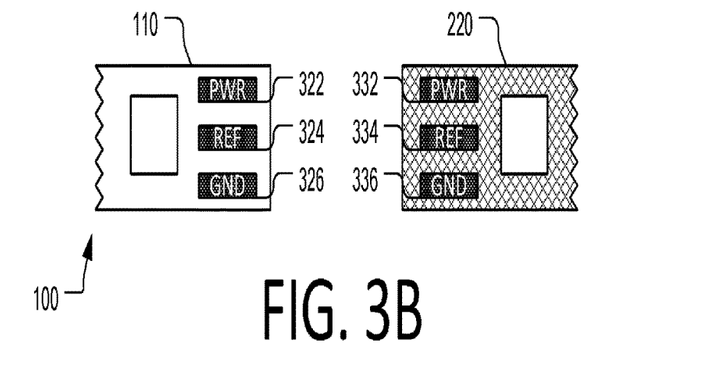
FIG. 3B is a diagram illustrating respective connection interfaces of the LED strip of FIG. 1 and the cuttable LED strip of FIG. 2B, according to aspects of the disclosure.

FIG. 3B depicts an example of a connection terminal configuration of the LED strip 100 and the cuttable LED strip 220. As illustrated, each segment 110 of the LED strip 100 may be provided with a set of three terminals, including a power terminal 322, a ground terminal 326, and a reference terminal 324. Similarly, the cuttable LED strip 220 may include a power terminal 332, a ground terminal 336, and a reference terminal 334. When the connector 310 is used to connect the segment 110 of the LED strip 100 to the cuttable LED strip 220, power terminal 322 is coupled to power terminal 332, power terminal 322 is coupled to power terminal 332, ground terminal 326 is coupled to ground terminal 336, and reference terminal 324 is coupled to reference terminal 334.

According to aspects of the disclosure, the power terminals 322 and 332 may be used to connect the cuttable LED strip 220 to the power supply of the LED strip 100. Similarly, the ground terminals 326 and 336 may be used to connect the cuttable LED strip 220 to ground. Furthermore, the reference terminals 324 and 334 may be used to feed a reference signal from the LED strip segment 110 to the cuttable LED strip 220. The reference signal may be any suitable type of signal that is representative of the flow rate of current through the LEDs in the segment 110. As is further discussed below, the reference signal is used to match the current in the cuttable LED strip to the current in the LED segment 110 in order to ensure uniform brightness.

Although in the present example the LED strip 100 includes only one segment 110, alternative implementations are possible in which the LED strip 100 includes a series of segments 110. Additionally or alternatively, when the LED strip 100 includes a series of segments connected in parallel to a power supply, the reference signal may be representative of the flow rate of current that is used to drive the LEDs in only one of the segments (e.g., the last segment). Additionally or alternatively, in some implementations, the reference signal may be representative of the flow rate of current that is used to drive only some of the LEDs in a particular segment (e.g., the last segment).

Although in the present example the LED strip segment 110 and the cuttable LED strip 220 have identical connection interfaces, in some implementations their connection interfaces may differ. For example, the connection interfaces may have different numbers of terminals or one of the connection interfaces may be missing a terminal. As another example, the terminals in the connection interface of the LED strip segment 110 may have different size(s), shape(s), or location(s) than those of the cuttable LED strip 220. When the connection interfaces differ, the connector 310 may play the secondary role of an adapter between the two interfaces. Thus, the present disclosure is not limited to any specific type of connection interface on either the LED strip segment 110 or the cuttable LED strip 220.

Figure 4:
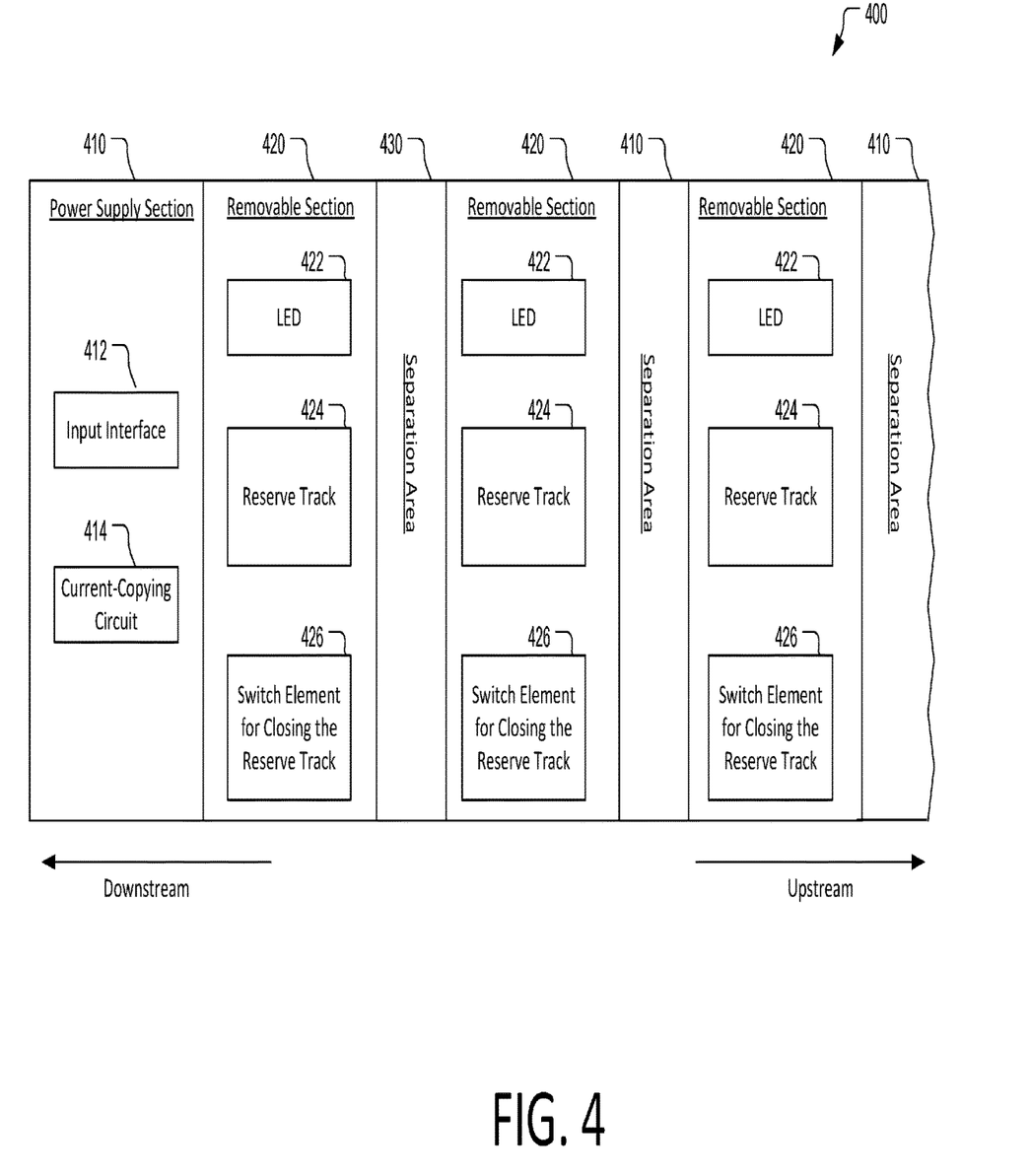
FIG. 4 is a diagram illustrating an example of a cuttable LED strip, according to aspects of the disclosure.

FIG. 4 is a diagram of an example a cuttable LED strip 400, according to aspects of the disclosure. The cuttable LED strip 400 includes a power supply section 410, a series of removable sections 420, and a series of separation areas 430. The separation areas 430 are interleaved with the removable sections 420, as shown.

The power supply section 410 may include an input interface 412 and a current-copying circuit 414. The input interface 412 may include one or more connection terminals, such as the terminals 332, 334, and 336, discussed with respect to FIG. 3B. Additionally or alternatively, the input interface 412 may include one or more electronic components and/or circuitry for conditioning or modifying any of the signals that are received via the input interface 412.

The signals received via the input interface 412 may include a reference signal and a power signal. Both the power signal and the reference signal may be received from an external LED strip that is connected to the cuttable LED strip 400. According to the present example, the reference signal may be representative of the flow rate of current that drives one or more LEDs in the external LED strip. The power signal may be received from a power supply of the external LED. The power supply may be either separate or integrated into the LED. The external LED strip and the cuttable LED strip may be connected in parallel to the power supply.

The power signal may be used to drive one or more of the LEDs 422 that are part of the cuttable LED strip 400. The current-copying circuit may include any suitable type of circuitry that is configured to match the flow rate of the power signal to that of the signal used to drive the one or more LEDs in the external LED strip. In other words, the current-copying circuit may copy the current in the external LED strip to the cuttable LED strip to ensure uniform brightness of the external LED strip and the cuttable LED strip.

Each removable section 420 may be removed from the cuttable LED strip without affecting the functionality of those removable sections 420 that remain coupled to the power supply section 410. Each removable section 420 may include a respective LED 422, a respective reserve track 424, and a respective switching element 426. The respective LED 422 of any of the removable sections 420 may include one or more LEDs that are installed in that section. The respective reserve track 424 of any of the removable sections 420 may provide an alternative current path to any of the LEDs 422 that remain after the cuttable LED strip 400 is cut in two pieces. The respective switching element 426 of any of the removable sections 420 may be configured to close the respective reserve track of that removable section when the separation area immediately upstream from the removable section is cut.

As the name suggests, the separation areas 430 are locations in the LED strip 400 where the cuttable LED strip 400 can be safely cut in order to reduce its length. When the cuttable LED strip 400 is cut in two pieces in any of the separation areas 430, the functionality of the LEDs in the removable sections located downstream from that separation area is retained. In some implementations, each of the separation areas 430 may be marked in order to inform users that the cuttable LED strip 400 can be cut there. Additionally or alternatively, in some implementations, each of the separation areas 430 may be perforated and/or precut in order to make it easier for users to pull different portions of the cuttable LED strip 400 apart. An example of one possible separation area implementation is discussed further below with respect to FIGS. 5A-B.

Figure 5A:
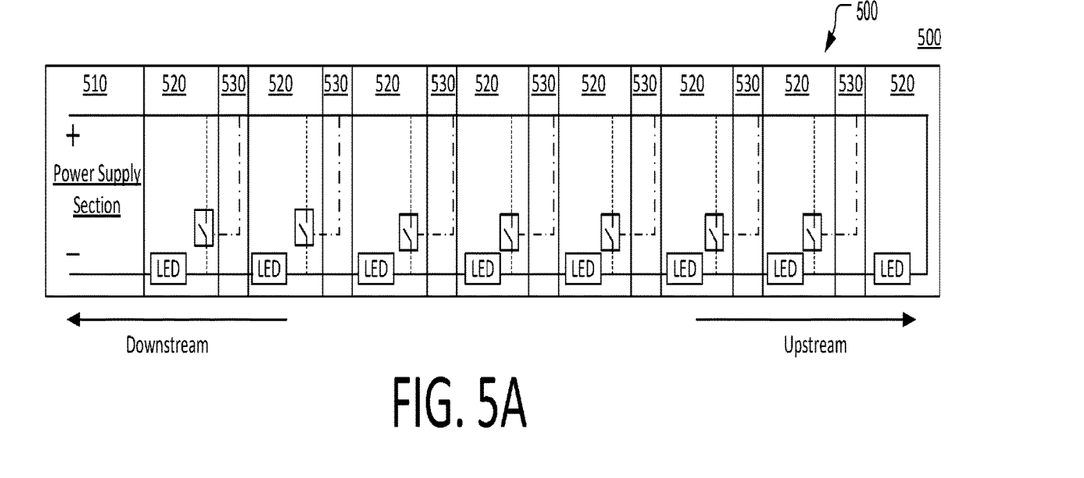
FIG. 5A is a diagram illustrating another example of a cuttable LED strip, according to aspects of the disclosure.

FIG. 5A is a diagram of an example of a cuttable LED strip 500, according to aspects to the disclosure. The cuttable LED strip 500 includes a power supply section 510, a plurality of removable sections 520, and a plurality of separation areas 530. The power supply section 510 may be the same or similar to the power supply section 410 discussed with respect to FIG. 4. Each of the removable sections 520 may include a respective LED, a respective reserve track, and a respective switching element. Each of the separation areas 530 may include a respective trip-wire, as shown.

As illustrated, the LEDs in different removable sections 520 are connected in series to the end of a power bus. The respective reserve tracks of the removable sections 420 are connected in parallel to the power bus. The reserve tracks are spaced apart from one another, and each reserve track is provided with a respective switching element that is arranged to open and close that reserve track. In some implementations, each respective switching element is provided with two connect-terminals and a control terminal CT, and configured to open and close a path between the two connect-terminals depending on the signal that is applied to the control terminal (e.g., a voltage signal). The respective control terminal CT of each switching element is connected to the power bus via a respective trip-wire. When the power bus is intact, the voltage of the power bus is applied to the control terminals CT of the switching elements, and the switching elements remain in the open state.

Figure 5B:
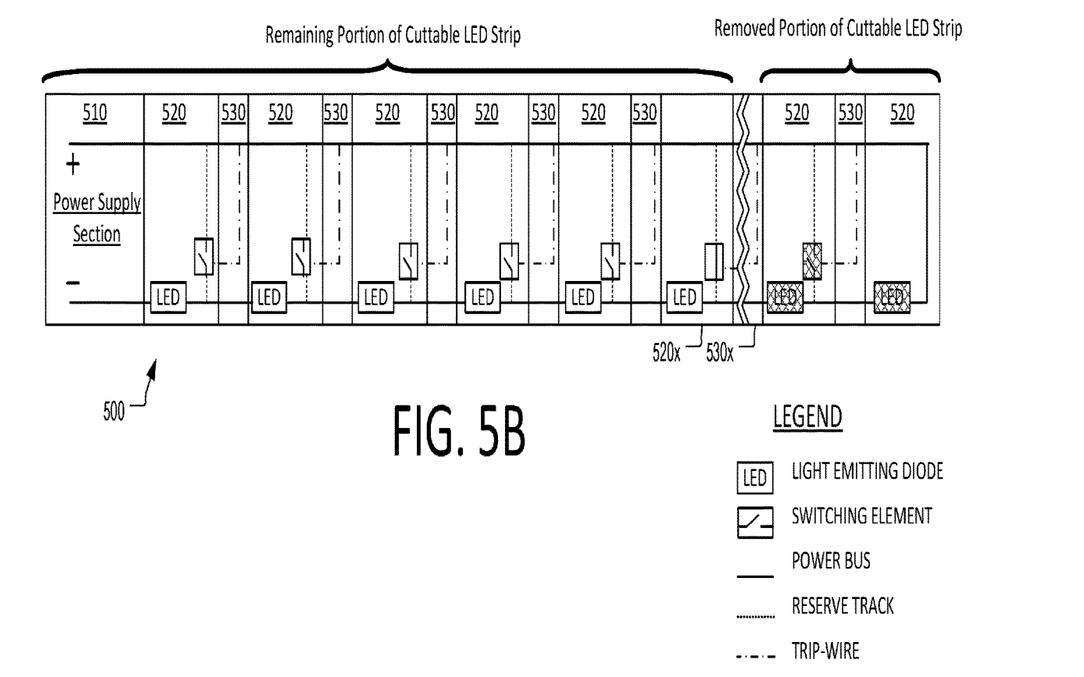
FIG. 5B is a diagram illustrating the operation of the cuttable LED strip of FIG. 5A, according to aspects of the disclosure.

Referring to FIG. 5B, when the cuttable LED strip is cut into a remaining portion and a removed portion in separation area 530x, the LED in the removable section 520x is disconnected from the end of the power bus. However, the trip-wire in separation area 530x is also severed as a result of cuttable LED strip 500 being cut, and this makes it impossible for the voltage of the power bus to continue to be applied to the control terminal CT of the switching element in the removable section 520x. The absence (or the mere drop) of voltage at the control terminal CT of the switching element of the removable section 530x causes the switching element to close when the cuttable LED strip 500 is energized. This in turn causes the LED in removable section 520x to be re-connected to the power bus, along with one or more other LEDs that are located downstream from it.

Figure 6:
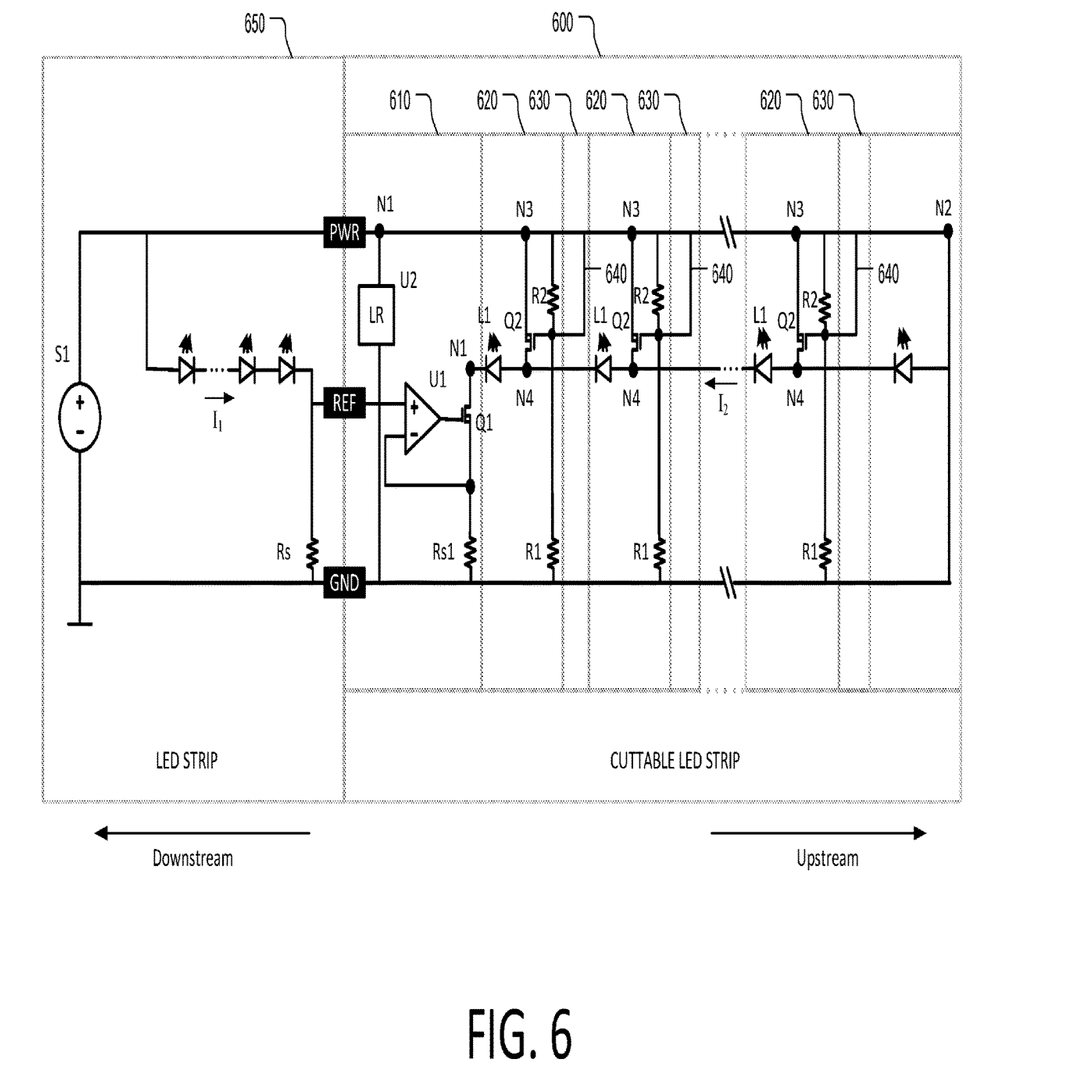
FIG. 6 is a circuit diagram illustrating yet another example of a cuttable LED strip, according to aspects of the disclosure.

FIG. 6 is a circuit diagram of a system including a cuttable LED strip 600 connected to a LED strip 650. The LED strip 650 includes a power supply S1 and a plurality of LEDs connected in series with a resistor Rs. The power supply S1 may be either an external power supply or a built-in power supply. Furthermore, the power supply S1 may be a constant current power supply or a constant voltage power supply. Although in the present example, the LED strip 650 includes one segment, alternative implementations are possible in which the LED strip 650 includes multiple segments connected in parallel to the power supply S1, such that when the LED strip 650 is turned on, the same current flows through each of the segments.

The cuttable LED strip 600 is connected to the LED strip 650 via the terminals labeled PWR, REF, and GND, respectively, and is powered by the power supply S1 of the LED strip 650. The cuttable LED strip 600 includes a power supply section 610, a plurality of removable sections 620, and a plurality of separation areas 630, as shown. The separation areas 630 and the removable sections 620 are interleaved.

The power supply section 610 includes a current-copying circuit that is configured to copy the current used to drive the LEDS in the LED strip 650 to the cuttable LED strip 600. As illustrated, the LEDs in the LED strip 650 are driven with the first current signal $I_1$, and the LEDs in the cuttable LED 600 are driven with the second current signal $I_2$. Thus, in some implementations, the current-copying circuit may include any suitable type of circuitry that is configured to cause the flow rate of the second current signal $I_2$ to match the flow rate of the first current signal $I_1$. In some implementations, the flow rate of the second current signal $I_2$ may be considered to match the flow rate of the first current signal $I_1$ when the flow rate of the second current signal $I_2$ is equal to the flow rate of the first current signal $I_1$.

Additionally or alternatively, in some implementations, the flow rate of the second current signal $I_2$ may be considered to match the flow rate of the first current signal $I_1$ when the flow rate of the second current signal $I_2$ is within a predetermined distance of the flow rate of the first current signal $I_1$. Thus, in some implementations, the current-copying circuit may cause the LEDs in the cuttable LED strip 600 to receive the same (or similar) current as the LEDs in the LED strip 650, thereby ensuring uniform brightness of the system.

Additionally or alternatively, in some implementations, the current-copying circuit may purposefully cause the LEDs in the cuttable LED strip 600 to receive a current that is offset from the current $I_1$ by some distance in order to compensate for differences between the LEDs in the LED strip 650 and the cuttable LED strip 600. For example, in such implementations, the current-copying circuit may ensure that the flow rate of the current signal $I_2$ is either lower or higher by a predetermined amount than the flow rate of the current $I_1$.

More particularly, in the example of FIG. 6, the current-copying circuit includes an operational transconductance amplifier (OTA) U1 that is arranged to feed its output to a metal-oxide-semiconductor field-effect transistor (MOSFET) Q1. The operational amplifier U1 receives a first reference signal and a second reference signal at its inputs. The first reference signal is generated using resistor Rs and it indicates the flow rate of the current signal $I_1$. The second reference signal is generated using resistor Rs1 and it indicates the flow rate of current signal $I_2$ across the LEDs in the cuttable LED strip 600. Both the first reference signal and the second reference signal may be voltage signals, with the first reference signal being the voltage drop across resistor Rs and the second reference signal being the voltage drop across resistor Rs1. In some implementations, the operational amplifier U1 may use the difference between the first reference signal and the second reference signal to cause the flow rate of the current signal $I_2$ to match the flow rate of the current signal $I_1$.

In some implementations, resistors Rs and Rs1 may have the same resistance. In some implementations, the power supply section 610 may include one or more LEDs. In some implementations, the power MOSFET Q1 may be selected to have a sufficient power rating to accommodate the voltage drop when all of the removable sections 620 have been removed. In some implementations, the OTA U1 may be powered using a voltage regulator U2. Voltage regulator U2 may be a traditional TL431-based voltage regulator and/or any other suitable type of voltage regulator. Alternatively, in some implementations, a Zener diode can be used instead of the voltage regulator U2 to save on cost.

Each of the removable sections 620 may include a respective LED L1, a respective reserve track N3-N4, a respective p-channel metal-oxide-semiconductor field-effect transistor (PMOS) Q2, a respective resistor R1, and a respective resistor R2. In any particular removable section 620, the function of the PMOS Q2 and resistors R1 and R2 is to connect the anode of the LED L1 to the power bus N1-N2 when a portion of it is cut away. In any particular removable section 620, the gate of the PMOS Q2 is normally shorted to its source by a conductor 640 (e.g., a trip-wire) situated in the separation area 630 that is located immediately upstream from that removable section. This causes the PMOS Q2 to be turned off, thus maintaining its respective reserve track N3-N4 open.

When the cuttable LED strip 500 is cut in two pieces in a particular separation area 630, the respective conductor 640 of that separation area is severed. As a consequence, several changes occur in the removable area 620 that is located immediately downstream from the particular separation area 630. For ease of description, this separation area is referred to as "corresponding removable area." More particularly, the two resistors R1 and R2 of the corresponding removable area form a resistive divider for biasing the gate of the PMOS Q2. This turns on the PMOS Q2 of the corresponding separation area and closes its reserve track N3-N4. When the PMOS Q2 of the corresponding removable area is turned on, it connects the anode of the LED that is connected to its drain to the power bus N1-N2, thus closing the circuit automatically.

In some aspects, the design of cuttable LED strip 600 can accommodate both constant-voltage power supplies (e.g., power supplies that provide a given output voltage, constant within a range of possible output currents) and constant-current power supplies (e.g., power supplies that provide a given output current, constant within a range of possible output voltages). In some implementations, as the length of the cuttable LED strip 600 increases, constant voltage drivers may ensure constant voltage but increasing current. Additionally or alternatively, in some implementations, the resistive divider formed by resistors R1 and R2 may be necessary in order to limit the gate-source voltage of PMOS Q2 as most commercially available PMOS have a max |Vgs| of 20V while the common bus voltage for LED strips is in the range from 24 to 48V.

FIGS. 1-6 are provided as an example only. At least some of the elements discussed with respect to these figures can be arranged in different order, combined, and/or altogether omitted. It will be understood that the provision of the examples described herein, as well as clauses phrased as "such as," "e.g.", "including", "in some aspects," "in some implementations," and the like should not be interpreted as limiting the disclosed subject matter to the specific examples. As used throughout the present specification, the term "cut" can refer to any action resulting in the division of a LED strip into two portions (e.g., a remaining portion and a removed portion). As used throughout the present specification, the term cut does not presuppose or exclude the use of a knife, scissors or some other instrument. As used throughout the present specification, the term "cut" encompasses actions such as tearing apart, pulling apart, breaking apart, etc.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

The invention claimed is:
1. A light-emitting diode (LED) strip, comprising:
a power bus;
a first switching element;
a first LED coupled to the first switching element, the first switching element arranged to couple the first LED to the power bus when the first LED is cut from the strip at a first location;
a second switching element; and
a second LED coupled to the second switching element, the second switching element arranged to couple the second LED to the power bus when the second LED is cut from the strip at a second, different location,
the first switching element comprising a transistor electrically coupled between an anode of the LED and the power bus, and a trip-wire electrically connected between a gate of the transistor and the power bus upstream of the LED.

2. The LED strip of claim 1, wherein the switching element further comprises:
a first resistor electrically coupled between the gate of the transistor and a positive rail of the power bus, and
a second resistor electrically coupled between the gate of the transistor and a ground rail of the power bus.

3. The LED strip of claim 2, wherein the anode of the LED is electrically coupled to a drain of the transistor.

4. The LED strip of claim 2, wherein the transistor is a p-channel metal-oxide-semiconductor field-effect transistor (PMOS).

5. The LED strip of claim 1, further comprising:
at least one other switching element; and
at least one other LED, each LED coupled to the power bus by a respective switching circuit.

6. The LED strip of claim 5, further comprising a plurality of removable sections, each of the plurality of removable sections comprising a single LED and a single switching element.

7. The LED strip of claim 6, further comprising a plurality of separation areas, each respective separation area disposed upstream of a respective removable section.

8. The LED strip of claim 7, wherein each of the plurality of separation areas comprises at least one of a marking, a perforation or pre-cut region configured for separation of the LED strip at the separation areas.

9. The LED strip of claim 7, wherein each of the switching elements comprises a transistor electrically coupled between an anode of a respective one of the LEDs and the power bus, and a trip-wire electrically coupled between a gate of the respective transistor and the power bus upstream of the respective LED, the transistor being disposed in a respective one of the removable sections and the tripwire being disposed in a respective one of the separation areas.

10. A light-emitting diode (LED) strip, comprising:
an input terminal for receiving a first reference signal;
a first LED coupled to a power bus and driven by a first current signal, the first current signal being supplied to the first LED via the power bus;
a current-copying circuit arranged to control a flow rate of the first current signal based on the first reference signal;
a first switching element arranged to re-couple the first LED to the power bus after the first LED is uncoupled from the power bus as a result of the LED strip being cut at a first location, the first switching element comprising a transistor electrically coupled between an anode of the LED and the power bus, and a trip-wire electrically connected between a gate of the transistor and the power bus upstream of the LED;
a second LED located coupled in series with the first LED to the power bus such that when the LED strip is cut in the first location, the second LED is removed from the LED strip and the first LED remains in the LED strip, and, when the LED strip is cut in the second location, both the first LED and the second LED remain in the LED strip.

11. The LED strip of claim 10, wherein:
the first reference signal is representative of a flow rate of a second current signal that drives one or more external LEDs; and
the current-copying circuit is arranged to match the flow rate of the first current signal to that of the second current signal.

12. The LED strip of claim 10, further comprising a conductor coupling a control terminal of the first switching element to the power bus, wherein the first switching element is arranged to transition to a closed state when the conductor is severed as a result of the LED strip being cut at the first location.

13. The LED strip of claim 10, further comprising a second switching element arranged to re-couple the second LED to the power bus when the second LED is disconnected from the end of the power bus as a result of the LED strip being cut at a second location.

14. The LED strip of claim 13, further comprising:
a first conductor that couples a first control terminal of the first switching element to the power bus, the first conductor being disposed at the first location; and
a second conductor that couples a second control terminal of the second switching element to the power bus, the second conductor being disposed at the second location, wherein the first switching element is arranged to transition to a closed state when the first conductor is severed as a result of the LED strip being cut at the first location, and wherein the second switching element is arranged to transition to a closed state when the second conductor is severed as a result of the LED strip being cut at the second location.

15. The LED strip of claim 10, wherein:
the first reference signal is a voltage signal, and the current-copying circuit includes an operational amplifier arranged to control the flow rate of the first current signal based on a difference between the first reference signal and a second reference signal that is representative of a voltage drop developed at least in part by the first LED.

16. The LED strip of claim 15, wherein the current-copying circuit further includes a resistor coupled in series with the first LED, and the second reference signal is generated using the resistor.

17. The LED strip of claim 15, wherein the current-copying circuit further includes a voltage regulator that is arranged to power the operational amplifier.

18. The LED strip of claim 10, wherein the first switching element further comprises:
a first resistor electrically coupled between the gate of the transistor and a positive rail of the power bus, and
a second resistor electrically coupled between the gate of the transistor and a ground rail of the power bus.

19. A light-emitting diode (LED) strip, comprising:
a power bus;
a first switching element;
a first LED coupled to the first switching element, the first switching element arranged to couple the first LED to the power bus when the first LED is cut from the strip at a first location;
a second switching element; and
a second LED coupled to the second switching element, the second switching element arranged to couple the second LED to the power bus when the second LED is cut from the strip at a second, different location,
the first switching element comprising a first resistor electrically coupled between the gate of the transistor and a positive rail of the power bus, and a second resistor electrically coupled between the gate of the transistor and a ground rail of the power bus.

20. A light-emitting diode (LED) strip, comprising:
a power bus;
a first switching element;

a first LED coupled to the first switching element, the first switching element arranged to couple the first LED to the power bus when the first LED is cut from the strip at a first location;
a second switching element;
a second LED coupled to the second switching element, the second switching element arranged to couple the second LED to the power bus when the second LED is cut from the strip at a second, different location; and
a plurality of removable sections, each of the plurality of removable sections comprising a single LED and a single switching element.

* * * * *